US012763617B2

(12) United States Patent
Saeki et al.

(10) Patent No.: US 12,763,617 B2
(45) Date of Patent: Oct. 13, 2026

(54) MOTOR

(71) Applicant: Nidec Corporation, Kyoto (JP)

(72) Inventors: Shintaro Saeki, Kyoto (JP); Masahiro Shiraishi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 236 days.

(21) Appl. No.: 18/641,966

(22) Filed: Apr. 22, 2024

(65) Prior Publication Data

US 2024/0364153 A1 Oct. 31, 2024

(30) Foreign Application Priority Data

Apr. 25, 2023 (JP) ................................ 2023-071318

(51) Int. Cl.
*H02K 1/18* (2006.01)
*H02K 1/2791* (2022.01)
*H02K 9/22* (2006.01)

(52) U.S. Cl.
CPC ........... *H02K 1/187* (2013.01); *H02K 1/2791* (2022.01); *H02K 9/223* (2021.01); *H02K 9/227* (2021.01)

(58) Field of Classification Search
CPC ............ H02K 9/22; H02K 9/22; H02K 9/227; H02K 9/223
USPC ....................................................... 310/254.1
See application file for complete search history.

(56) References Cited

U.S. PATENT DOCUMENTS 3,009,072 A * 11/1961 Mossay .................... H02K 1/32 310/64
3,075,103 A * 1/1963 Ward, Jr. ............... H02K 9/227 310/260
3,109,947 A * 11/1963 Thompson ............... H02K 9/00 310/260
5,073,734 A * 12/1991 Combette ............ H02K 41/025 310/91
5,084,641 A * 1/1992 Saima ...................... H02K 9/06 310/51
6,278,217 B1 * 8/2001 Kliman ................ H02K 15/085 310/179
6,800,971 B1 * 10/2004 Mangold ................ F02N 11/04 310/58
6,815,848 B1 * 11/2004 Glew ..................... H02K 5/207 310/58
7,042,124 B2 * 5/2006 Puterbaugh .............. H02K 5/10 310/43
7,550,882 B2 * 6/2009 Verhaegen ............... H02K 3/24 310/58
7,589,441 B2 * 9/2009 Kalsi ........................ H02K 1/12 310/180
7,705,496 B2 * 4/2010 Zisler ....................... H02K 9/14 310/58

(Continued)

FOREIGN PATENT DOCUMENTS

JP 2000-228843 A 8/2000

*Primary Examiner* — Maged M Almawri
(74) *Attorney, Agent, or Firm* — Keating & Bennett, LLP

(57) ABSTRACT

A motor includes a heat dissipation portion located in one axial direction from a coil portion located on a stator core of a magnetic body. The heat dissipation portion is separate from a bracket, and is held by a stator holder of the bracket. The heat dissipation portion includes an annular portion having an annular shape surrounding the stator holder and being located on a radially outer surface of the stator holder. An extension extends radially outward from the annular portion.

12 Claims, 6 Drawing Sheets

(56) References Cited

U.S. PATENT DOCUMENTS

| | | | | |
|---|---|---|---|---|
| 8,247,933 | B2 * | 8/2012 | Dang | H02K 1/20 310/59 |
| 8,378,550 | B2 * | 2/2013 | Bradfield | H02K 9/00 310/58 |
| 8,405,262 | B1 * | 3/2013 | Beatty | H02K 1/20 310/58 |
| 9,362,785 | B2 * | 6/2016 | Marvin | H02K 15/0431 |
| 9,768,666 | B2 * | 9/2017 | Büttner | H02K 1/20 |
| 10,958,125 | B2 * | 3/2021 | Wettlaufer | H02K 11/33 |
| 12,009,724 | B2 * | 6/2024 | Makino | H02K 21/22 |
| 12,463,473 | B2 * | 11/2025 | Kouda | H02K 3/325 |
| 12,537,421 | B2 * | 1/2026 | Luna Acevedo | H02K 7/1823 |
| 2002/0063494 | A1 * | 5/2002 | Yoshikawa | H02K 1/187 310/67 R |
| 2002/0167232 | A1 * | 11/2002 | Randall | H02K 9/227 310/54 |
| 2007/0228848 | A1 * | 10/2007 | Wiker | H02K 5/18 310/52 |
| 2009/0051233 | A1 * | 2/2009 | Scott | H02K 21/24 310/156.01 |
| 2009/0261668 | A1 * | 10/2009 | Mantere | H02K 5/203 310/54 |
| 2011/0101700 | A1 * | 5/2011 | Stiesdal | H02K 21/22 290/55 |
| 2012/0299407 | A1 * | 11/2012 | Miyama | H02K 11/33 310/63 |
| 2014/0292163 | A1 * | 10/2014 | Lau | H02K 9/14 310/60 R |
| 2018/0123428 | A1 * | 5/2018 | Sturm | H02K 5/207 |
| 2020/0177056 | A1 * | 6/2020 | Nakamura | H02K 5/18 |
| 2022/0085685 | A1 * | 3/2022 | Makino | H02K 9/227 |
| 2024/0039348 | A1 * | 2/2024 | Holmqvist | H02K 7/085 |

* cited by examiner

MOTOR

CROSS REFERENCE TO RELATED APPLICATIONS

The present application claims priority under 35 U.S.C. § 119 to Japanese Patent Application No. 2023-071318, filed on Apr. 25, 2023, the entire contents of which are hereby incorporated herein by reference.

1. FIELD OF THE INVENTION

The present disclosure relates to a motor.

2. BACKGROUND

More emphasis has been conventionally placed on heat dissipation of a motor. Thus, various devices for dissipating heat generated in a stator coil have been proposed.

However, a conventional motor does not refer to means for dissipating transferred heat from a motor bracket to the outside of the motor. Thus, although an increase in an amount of heat generated in a stator coil allows the heat to be dissipated to the motor bracket, the heat may not be sufficiently dissipated from the motor bracket to the outside of the motor.

SUMMARY

A motor according to an example embodiment of the present disclosure includes a rotor, a stator, a bracket, and a heat dissipation portion. The rotor is rotatable about a central axis extending in an axial direction. The stator includes a stator core of a magnetic body in which a coil portion is located. The bracket includes a stator holder in a tubular shape extending in the axial direction and surrounding the central axis, the stator holder holding the stator core. The heat dissipation portion is located in one axial direction from the coil portion while being separate from the bracket, and is held by the stator holder. The heat dissipation portion includes an annular portion and an extension. The annular portion has an annular shape surrounding the stator holder, and is located on a radially outer surface of the stator holder. The extension extends radially outward from the annular portion.

The above and other elements, features, steps, characteristics and advantages of the present disclosure will become more apparent from the following detailed description of the example embodiments with reference to the attached drawings.

DETAILED DESCRIPTION

Hereinafter, example embodiments will be described with reference to the drawings.

A motor 100 herein has a central axis CA parallel to a direction that is referred to as an “axial direction”. The axial direction includes one direction from a rotor hub 11 to a heat dissipation portion 4, which are described later, the one direction being referred to as “one axial direction Da”, and another direction from the heat dissipation portion 4 to the rotor hub 11, the other direction being referred to as “the other axial direction Db”. The central axis CA is orthogonal to a direction that is referred to as a “radial direction”, and a rotational direction about the central axis CA is referred to as a “circumferential direction”. The radial direction includes direction approaching the central axis CA, the one direction being referred to as “radially inward”, and another direction away from the central axis CA, the other direction being referred to as “radially outward”.

The term, “annular shape”, herein includes not only a shape continuously connected without any cut along the entire circumference in the circumferential direction about the central axis CA but also a shape having one or more cuts in a part of the entire circumference about the central axis CA. The “annular shape” also includes a shape having a closed curve on a curved surface that intersects the central axis CA about the central axis CA.

Positional relationships between any one of an azimuth, a line, and a plane and another one of them include “parallel” that includes not only a state in which both of them do not intersect at all no matter how long they extend, but also a state in which they are substantially parallel. The terms, “perpendicular” and “orthogonal”, include not only a state in which the both of them intersect each other at 90 degrees, but also a state in which they are substantially perpendicular and a state in which they are substantially orthogonal, respectively. That is, the terms, “parallel”, “perpendicular”, and “orthogonal” each include a state in which the positional relationship between the both of them has an angular deviation to the extent without departing from the gist of the present disclosure.

These terms are each a designation that is simply used for description, and thus do not intend to limit actual positional relationships, directions, names, and the like.

Figure 1:
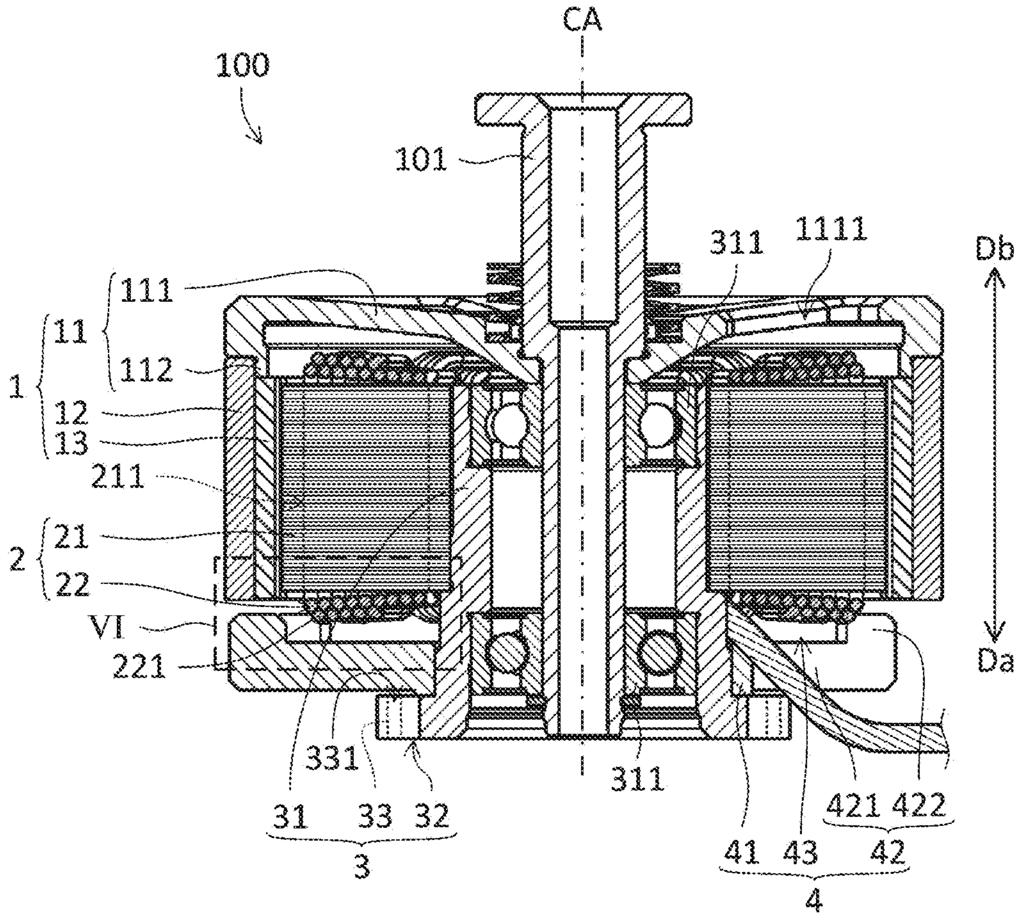
FIG. 1 is a sectional view illustrating a configuration example of a motor according to an example embodiment of the present disclosure.
Figure 2:
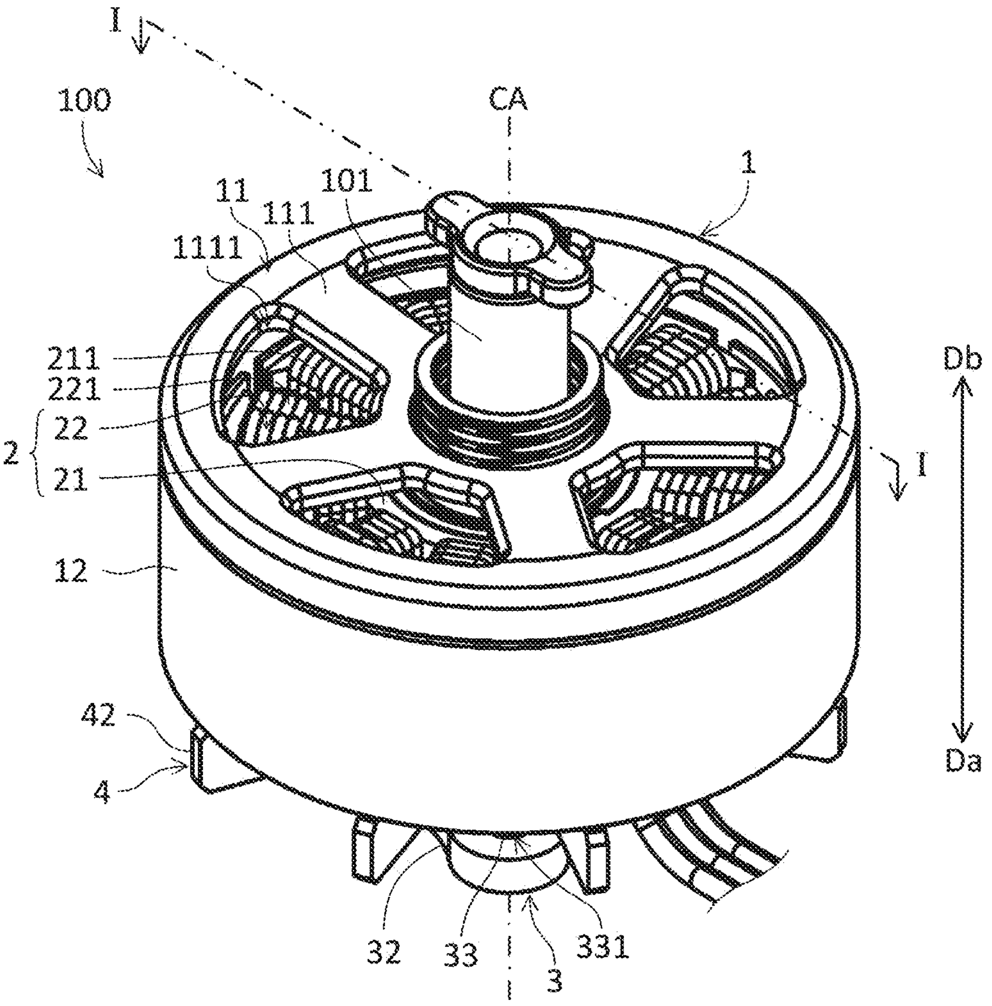
FIG. 2 is an external view of a motor according to an example embodiment of the present disclosure.
Figure 3:
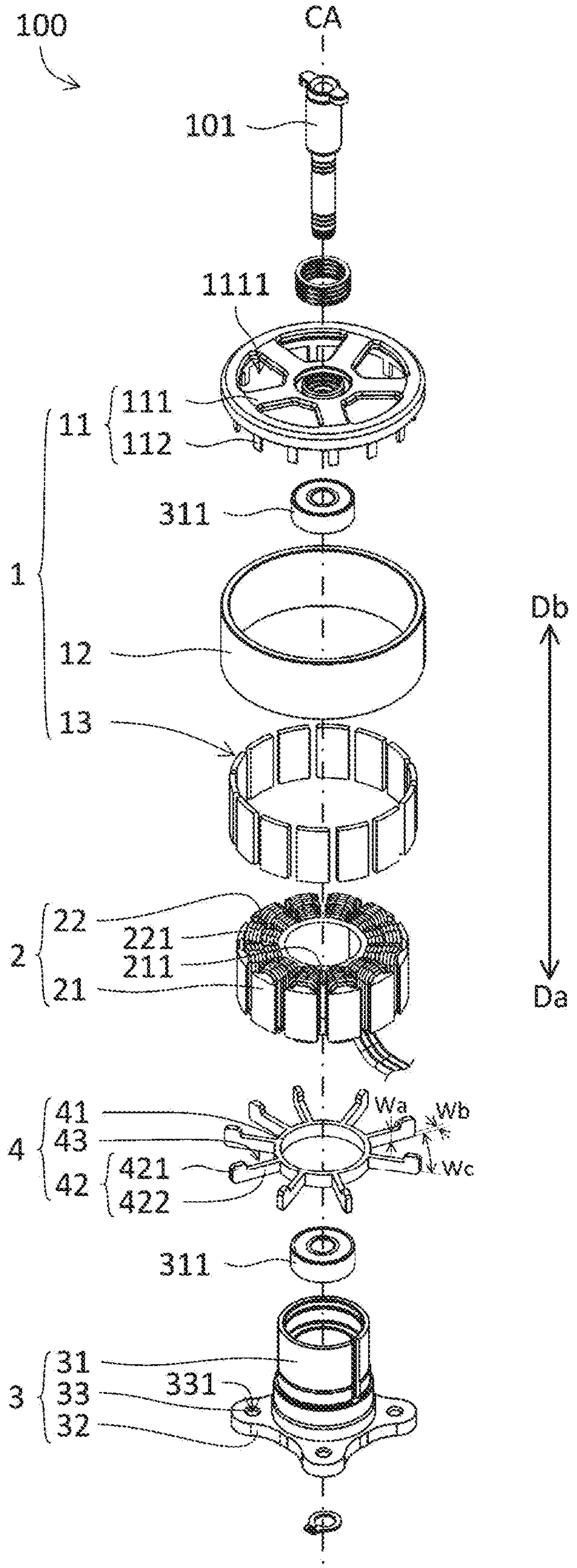
FIG. 3 is an exploded perspective view of a motor according to an example embodiment of the present disclosure.
Figure 4:
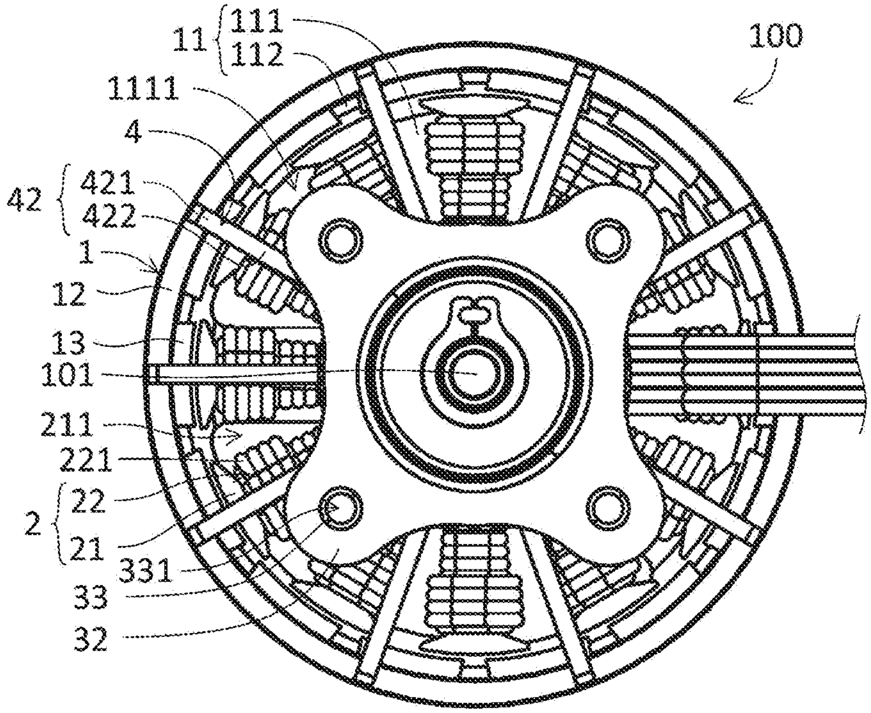
FIG. 4 is a plan view of a motor according to an example embodiment of the present disclosure as viewed from a side in one axial direction toward the other side in the axial direction.

FIG. 1 is a sectional view illustrating a configuration example of the motor 100. FIG. 2 is an external view of the motor 100. FIG. 3 is an exploded perspective view of the motor 100. FIG. 4 is a plan view of the motor 100 as viewed from a side in the one axial direction Da toward the other axial direction Db. FIG. 1 illustrates a sectional structure of the motor 100 taken along a virtual plane including a two-dot chain line I-I and the central axis CA in FIG. 2.

As illustrated in FIG. 1, the motor 100 includes a shaft 101, a rotor 1, a stator 2, a bracket 3, and a heat dissipation portion 4.

The shaft 101 has a tubular shape surrounding the central axis CA and extending in the axial direction, and is rotatable together with the rotor 1 about the central axis CA in the present example embodiment. That is, the shaft 101 is a rotation shaft of the motor 100. However, the shaft 101 is not limited to the example of the present example embodiment, and may have a solid rod shape. The shaft 101 may be also a fixed shaft and may not be rotatable about the central axis CA. In this case, a bearing for the shaft 101 to rotatably support the rotor 1 is disposed between the shaft 101 and the rotor 1.

The rotor 1 is rotatable about the central axis CA extending in the axial direction. As described above, the motor 100 includes the rotor 1. As illustrated in FIG. 1, the rotor 1 includes a rotor hub 11, a rotor tubular part 12, and a magnet 13.

The rotor hub 11 is disposed in the other axial direction Db from the stator 2, and extends radially outward from the shaft 101. As illustrated in FIGS. 1 to 3, the rotor hub 11 includes a top plate part 111 and an outer wall part 112. The top plate part 111 expands radially outward from a radially outer surface of the shaft 101 in the other axial direction Db from the shaft 101. The outer wall part 112 protrudes in the one axial direction Da from a radially outer end portion of the top plate part 111. In the present example embodiment, outer wall parts 112 are disposed side by side in the circumferential direction. However, the outer wall part 112 is not limited to this example, and may have an annular shape surrounding the central axis CA.

The top plate part 111 of the rotor hub 11 is provided with an opening 1111. That is, the rotor hub 11 includes the opening 1111. The opening 1111 allows a side in the one axial direction Da of the top plate part 111 to communicate with a side in the other axial direction Db of the top plate part 111. That is, the opening 1111 allows the outside of the rotor 1 to communicate with the inside of the rotor 1. This structure enables ventilation between inside and outside the rotor 1 through the opening 1111 when the rotor 1 rotates. In the present example embodiment, five openings 1111 are disposed side by side in the circumferential direction. However, the opening 1111 is not limited to this example, and the opening 1111 may be one in number, or two or more except five in number.

The rotor tubular part 12 has a tubular shape extending in the axial direction and surrounds the stator 2. The rotor tubular part 12 is a so-called back iron made of metal such as SUS, for example. The rotor tubular part 12 includes another axial end portion inside which the outer wall part 112 is fitted. In other words, the outer wall part 112 is disposed radially inward of the other axial end portion of the rotor tubular part 12. The outer wall part 112 has a radially outer surface in contact with a radially inner surface of the rotor tubular part 12 on a side in the other axial direction Db.

The magnet 13 is disposed on the radially inner surface of the rotor tubular part 12 while extending in the axial direction and expanding in the circumferential direction. As described above, the rotor 1 includes the magnet 13. The magnet 13 faces the stator 2 in the radial direction. The magnet 13 is disposed with magnetic poles (i.e., a S pole and an N pole) that are alternately changed in the circumferential direction. The magnet 13 may be a tubular member extending in the axial direction, or may have a configuration in which a plurality of magnet pieces extending in the axial direction are disposed side by side in the circumferential direction.

The stator 2 is supported by a stator holder 31 of the bracket 3, and rotationally drives the rotor 1. The stator 2 is disposed radially inward of the magnet 13 of the rotor 1. Thus, the motor 100 is an outer rotor type.

The stator 2 includes a stator core 21 of a magnetic body in which a coil portion 22 is disposed. As described above, the motor 100 includes the stator 2. Specifically, the stator 2 includes a stator core 21 and a plurality of coil portions 22.

The stator core 21 is an annular magnetic body and is disposed on a radially outer surface of the stator holder 31 of the bracket 3. The stator core 21 in the present example embodiment is a laminate of electromagnetic steel plates, and faces the magnet 13 in the radial direction. The stator core 21 also includes a slot 211. The slot 211 passes through the stator core 21 in the axial direction and constitutes a plurality of slots 211 disposed side by side in the circumferential direction.

The plurality of coil portions 22 are disposed side by side in the respective slots 211 of the stator core 21 in the circumferential direction. Each of the coil portions 22 includes a conductive wire 221 in a coil shape disposed on the stator core 21 with an insulator (not illustrated) interposed therebetween. The insulator has electrical insulation properties and is configured to cover a surface of the stator core 21. The conductive wire 221 is an enamel-coated copper wire or a metal wire coated with an electrically insulating member, for example, and is wound around a tooth (not illustrated) of the stator core 21 to form the coil portion 22. When a drive current is supplied to each of the coil portions 22, the stator 2 is excited to drive the rotor 1.

The bracket 3 includes the stator holder 31, an arm part 32, and an attachment portion 33.

The stator holder 31 has a tubular shape extending in the axial direction and surrounding the central axis CA, and holds the stator core 21. As described above, the motor 100 includes the bracket 3, and the bracket 3 includes the stator holder 31. The stator holder 31 is made of a non-magnetic metal such as aluminum. However, this example does not exclude a configuration in which the stator holder 31 is not made of metal. Although the material of the stator holder 31 may be resin, for example, a material having high thermal conductivity is preferable. The stator holder 31 is provided on its inner peripheral surface (radially inner surface) with a bearing 311 through which the shaft 101 is inserted. The stator holder 31 rotatably supports the shaft 101 using the bearing 311.

The arm part 32 extends radially outward from one axial end portion of the stator holder 31. The arm part 32 in the present example embodiment constitutes four arm parts 32 disposed side by side in the circumferential direction. Each of the arm parts 32 radially extends from the one axial end portion of the stator holder 31 toward between the extensions 42 adjacent to each other in the circumferential direction of the heat dissipation portion 4. However, the arm part 32 is not limited to the example of FIG. 5, and the number of arm parts 32 may be one, or two or more except four.

The attachment portion 33 is a component for attaching the motor to an external predetermined member. As described above, the bracket 3 includes the attachment portion 33. The attachment portion 33 is disposed on a radially outer side of the arm part 32. The attachment portion 33 in the present example embodiment includes a through-hole 331 extending in the axial direction. The through-hole 331 serves as a screw fixing hole. However, the attachment portion 33 is not limited to this example.

The heat dissipation portion 4 is disposed in the one axial direction Da from the coil portion 22 and is held by the stator holder 31. As described above, the motor 100 includes the heat dissipation portion 4. The heat dissipation portion 4 is separate from the bracket 3. Disposing the heat dissipation portion 4 separately from the bracket 3 including the stator holder 31 enables each of the bracket 3 and the heat dissipation portion 4 to be more easily formed as compared with a case where both of them are integrated. For example, when the both of them are molded, a complicated mold may not be newly prepared. Thus, a manufacturing process of the motor 100 can be partially simplified.

The heat dissipation portion 4 includes the annular portion 41 and the extension 42. As illustrated in FIG. 3, the annular portion 41 has an annular shape surrounding the stator holder 31 and is disposed on the radially outer surface of the stator holder 31. The extension 42 extends radially outward from the annular portion 41. The annular portion 41 is in contact with the radially outer surface of the stator holder 31, and is capable of transmitting sufficient heat from the stator holder 31.

Extending the extension 42 from the annular portion 41 enables increase in surface area of the heat dissipation portion 4. Thus, heat transmitted from the coil portion 22 to the heat dissipation portion 4 via the stator core 21 and the stator holder 31 can be efficiently dissipated from the heat dissipation portion 4. As a result, the motor 100 can be improved in heat dissipation performance.

At least the annular portion 41 of the heat dissipation portion 4 is preferably made of aluminum or an aluminum alloy. For example, the annular portion 41 in the present example embodiment is integrated with the extension 42. The heat dissipation portion 4 is made of aluminum or an aluminum alloy. The aluminum or the aluminum alloy is light metal, and has non-magnetism and good thermal conductivity. Thus, the motor 100 can be prevented from increasing in weight due to placement of the heat dissipation portion 4. Additionally, heat can be efficiently transmitted from the stator holder 31 to at least the annular portion 41 of the heat dissipation portion 4 without being affected by a magnetic flux formed by the coil portion 22. However, this example does not exclude a configuration in which at least the annular portion 41 of the heat dissipation portion 4 is made of a material other than aluminum and an aluminum alloy. The material only needs to have sufficient thermal conductivity, and preferably has a lower density. For example, the material may be a metal other than aluminum and an aluminum alloy, or may be ceramic, a thermally conductive resin, or the like.

The extension 42 constitutes a plurality of extensions 42 disposed side by side in the circumferential direction. For example, nine extensions 42 extend radially outward from the annular portion 41 in a radial manner in the present example embodiment. This structure enables increase in surface area of the heat dissipation portion 4 in accordance with the number of extensions 42. Even when the extension 42 increases in number, the heat dissipation portion 4 is not substantially changed in axial size. Thus, the heat dissipation portion 4 can be formed in a compact shape, so that increase in size of the motor 100 (particularly, increase in axial size) can be suppressed or prevented. However, the example described above does not exclude a configuration in which the number of extensions 42 is one, or two or more except nine.

The number of extensions 42 in the present example embodiment is less than the number of coil portions 22 as illustrated in FIG. 3. However, the number of extensions 42 is not limited to this example, and the number of extensions 42 may be equal to or larger than the number of coil portions 22.

As illustrated in FIG. 1, the extension 42 is disposed in the other axial direction Db from the attachment portion 33. The extension 42 is preferably disposed between the attachment portions 33 adjacent to each other in the circumferential direction when viewed from the axial direction as illustrated in FIG. 4. This structure enables the extension 42 to be prevented from overlapping the attachment portion 33 in the axial direction. The extension 42 is thus easily exposed to the outside of the motor 100 in the axial direction. Thus, air in contact with the extension 42 is easily exchanged in the axial direction. As a result, the heat dissipation portion 4 can be improved in heat dissipation performance. However, this example does not exclude a configuration in which at least one attachment portion 33 overlaps the extension 42 in the axial direction.

The extension 42 is more preferably located at a circumferential position different from a circumferential position of the through-hole 331 of the attachment portion 33. That is, the extension 42 does not overlap the through-hole 331 when viewed from the axial direction. Thus, the extension 42 is less likely to interfere when the motor 100 is attached to an external predetermined member by fastening a screw passing through the through-hole 331. As a result, screw fastening operation is facilitated.

The extension 42 is preferably located between the coil portions 22 adjacent to each other in the circumferential direction when viewed from the axial direction. At least a part of one axial end portion (e.g., a coil head on a side in the one axial direction Da) of the coil portion 22 is exposed to the outside of the motor 100. Here, the coil head on the side in the one axial direction Da is a part of the coil portion 22 located in the one axial direction Da from one axial end portion of the stator core 21. The coil head on a side in the other axial direction Db is a part of the coil portion 22 located in the other axial direction Db from the other axial end portion of the stator core 21.

That is, the extension 42 preferably does not overlap the coil portion 22 when viewed from the axial direction. This structure facilitates exchange of air in contact with the coil portion 22 (particularly, the coil head) in the axial direction. Thus, the coil portion 22 can be easily cooled by air directly. However, this example does not exclude a configuration in which at least one extension 42 overlaps the coil portion 22 when viewed from the axial direction.

The extension 42 preferably has a minimum axial width Wa (e.g., an axial width of a connector 422 to be described later) that is larger than a width Wb of the extension 42 in a direction perpendicular to the axial direction and the radial direction (see FIG. 3). This structure enables a circumferential interval Wc between the extensions s 42 adjacent to each other in the circumferential direction to be further increased. Thus, the air in contact with the extension 42 is more easily exchanged. As a result, the heat dissipation portion 4 can be improved in heat dissipation performance. Additionally, one axial end portion (particularly, the coil head) of the stator 2 is easily exposed to the outside of the motor 100 in the axial direction. Thus, the air in contact with the stator 2 (particularly, the coil head) is more easily exchanged. As a result, the stator 2 can be easily cooled by air directly. However, this example does not exclude a configuration in which Wa is equal to or less than Wb.

Next, the extension 42 includes a distal end portion 421 and the connector 422. The distal end portion 421 expands in a direction perpendicular to the radial direction at a radially outer end portion of the extension 42. The connector 422 extends in the radial direction to connect the annular portion 41 to the distal end portion 421. Disposing the distal end portion 421 with a wide width at a distal end portion of the extension 42 enables the heat dissipation portion 4 to be further increased in surface area. Thus, the heat dissipation portion 4 can be further improved in heat dissipation performance.

For example, the connector 422 in the present example embodiment extends radially outward from a radially outer end portion of the annular portion 41. The distal end portion 421 expands in the other axial direction Db from a radially outer end portion of the connector 422. However, the example described in the present example embodiment does not exclude a configuration in which the distal end portion 421 expands in the one axial direction Da or toward both axial sides, a configuration in which the distal end portion 421 expands in the circumferential direction, and the like.

As illustrated in FIG. 3, the heat dissipation portion 4 in the present example embodiment further includes a first recess 43. The first recess 43 is recessed in the one axial direction Da in the other axial end portion of the heat dissipation portion 4, and can accommodate one axial end portion of the coil portion 22. Specifically, the first recess 423 is formed by one axial end surface of the annular portion 41, a radially inner surface of the distal end portion 421 and one axial end surface of the connector 422 of corresponding one of the extensions 42.

Accommodating the one axial end portion of the coil portion 22 in the first recess 43 enables the heat dissipation portion 4 to be disposed closer to the coil portion 22 in the axial direction. That is, the heat dissipation portion 4 (particularly, the annular portion 41 and the connector 422) can be disposed closer to the coil portion 22 in the other axial direction Db. Thus, the motor 100 can be further reduced in axial size. This structure can contribute to downsizing of the motor 100.

The distal end portion 421 in the present example embodiment has a width (thickness) equal to a width (thickness) of the connector 422 in a direction perpendicular to both the axial direction and the radial direction. This structure enables the extension 42 to have a uniform width in the direction perpendicular to both the axial direction and the radial direction. This structure also facilitates formation of the extension 42. For example, a plate-like member extending in the radial direction from the annular portion 41 and expanding in the axial direction is formed by extrusion molding. Then, a part radially inward of a radially outer end portion of the plate-shaped member is cut in the other axial end portion of the plate-shaped member. This processing enables forming the distal end portion 421 and the connector 422. Thus, the heat dissipation portion 4 can be manufactured at low cost.

However, the distal end portion 421 is not limited to this example, and the distal end portion 421 may have a width (thickness) larger than a width (thickness) of the connector 422 in the direction perpendicular to both the axial direction and the radial direction. This structure enables the extension 42 to be increased in surface area in accordance with a difference between both the widths. That is, the heat dissipation portion 4 can be increased in heat dissipation area.

Alternatively, the distal end portion 421 is not limited to this example, and the distal end portion 421 may have a width (thickness) smaller than a width (thickness) of the connector 422 in the direction perpendicular to both the axial direction and the radial direction. This structure enables the extension 42 to be reduced in volume in accordance with a difference between both the widths. That is, the heat dissipation portion 4 can be reduced in weight. Additionally, material used for forming the heat dissipation portion 4 can be saved.

Figure 5:
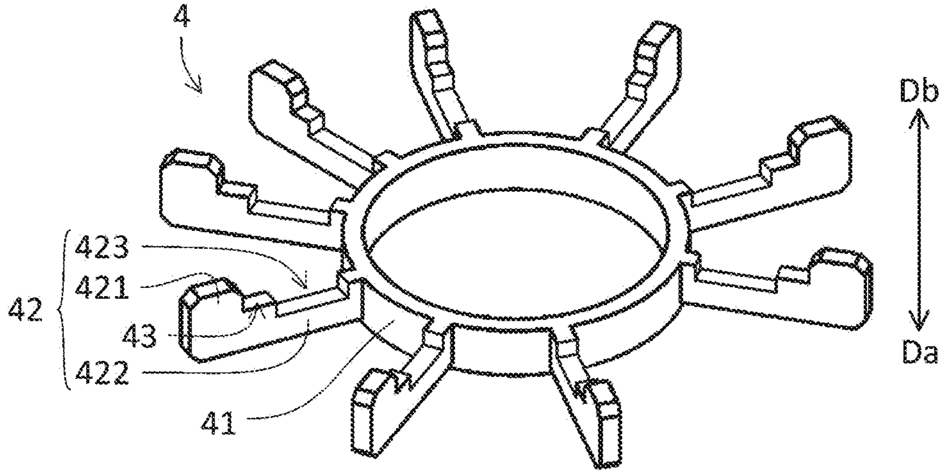
FIG. 5 is a perspective view illustrating a modification of a heat dissipation portion according to an example embodiment of the present disclosure.

FIG. 5 is a perspective view illustrating a modification of the heat dissipation portion 4. As illustrated in FIG. 5, the extension 42 may further include a second recess 423. The second recess 423 is recessed in the one axial direction Da in the other axial end portion of the extension 42, and can accommodate one axial end portion of the coil portion 22. Specifically, the second recess 423 is disposed radially inward of the distal end portion 421 and is recessed in the one axial direction Da from the other axial end portion of the connector 422. The second recess 423 includes a radially inner end portion that is away from the annular portion 41 in a radially outward direction in FIG. 5. However, the second recess 423 is not limited to this example, and the radially inner end portion of the second recess 423 in at least one extension 42 may be in contact with (a radially outer surface of) the annular portion 41. The second recess 423 includes a radially outer end portion that is away from the distal end portion 421 in a radially inward direction in FIG. 5. However, the second recess 423 is not limited to this example, and the radially outer end portion of the second recess 423 in at least one extension 42 may be in contact with (a radially inner end portion of) the distal end portion 421.

Accommodating the one axial end portion of the coil portion 22 in the second recess 423 enables the heat dissipation portion 4 to be disposed closer to the coil portion 22 in the axial direction. That is, the heat dissipation portion 4 (particularly, the annular portion 41 and the connector 422) can be disposed closer to the coil portion 22 in the other axial direction Db. Thus, the motor 100 can be further reduced in axial size. This structure can contribute to downsizing of the motor 100.

However, the example of FIG. 5 does not exclude a configuration in which at least one extension 42 does not include the second recess 423, and does not exclude a configuration in which one axial end portion of the coil portion 22 is not accommodated in the second recess 423 in at least one extension 42.

Next, a modification of the example embodiment will be described. The extension 42 in the modification is thermally connected to the coil portion 22 through a heat conductor 5. Besides this, the modification is similar to the example embodiment. Components in the modification similar to those in the example embodiment described above are denoted by the same reference numerals, and description thereof may not be described.

Figure 6A:
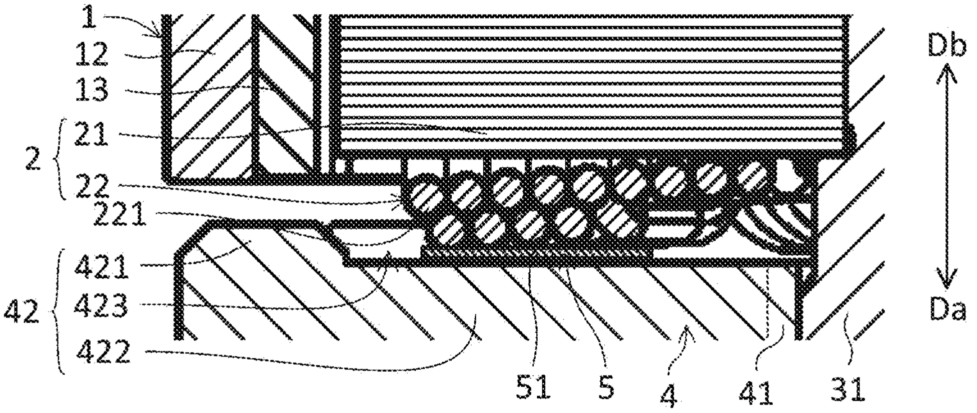
FIG. 6A is an enlarged sectional view illustrating a placement example of a heat conductor in a modification of an example embodiment of the present disclosure.
Figure 6B:
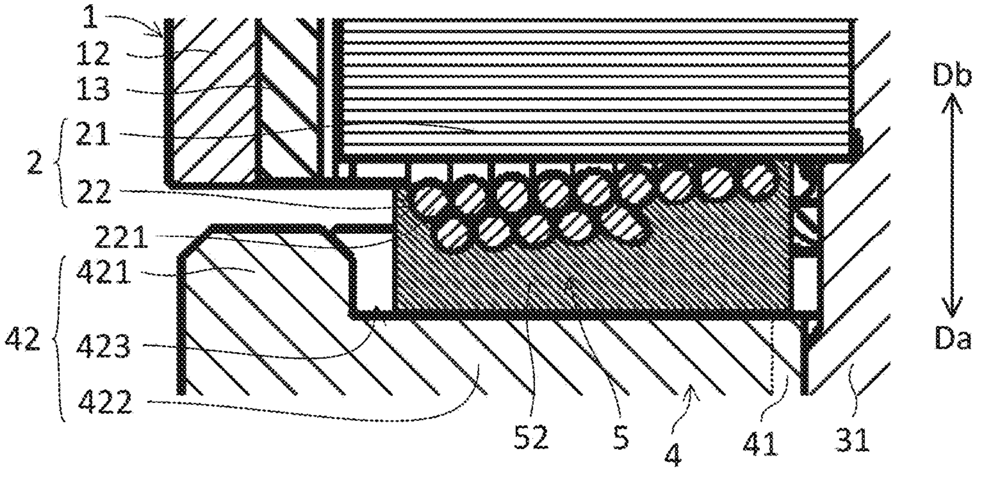
FIG. 6B is an enlarged sectional view illustrating another placement example of a heat conductor in a modification of an example embodiment of the present disclosure.

FIG. 6A is an enlarged sectional view illustrating a placement example of the heat conductor 5 in the modification. FIG. 6B is an enlarged sectional view illustrating another placement example of the heat conductor 5 in the modification. FIGS. 6A and 6B each correspond to a part VI surrounded by a broken line in FIG. 1.

As illustrated in FIGS. 6A and 6B, the motor 100 further includes the heat conductor 5. The heat conductor 5 is disposed between the coil portion 22 and the extension 42 in the axial direction, and is in contact with the coil portion 22 and the extension 42. The heat conductor 5 uses a material having high heat conduction, and more preferably, uses a material having not only high heat conduction but also electrical insulation properties. This configuration enables heat to be transmitted from the coil portion 22 to the heat dissipation portion 4 through not only a heat conduction path through the stator core 21, the stator holder 31, and the annular portion 41, but also a heat conduction path through the heat conductor 5. Thus, more heat can be transmitted to the heat dissipation portion 4. Then, the latter (the heat conduction path through the heat conductor 5) has a path length shorter than a path length of the former (the heat conduction path through the stator core 21, the stator holder 31, and the annular portion 41). Thus, heat transference from the coil portion 22 to the heat dissipation portion 4 can be significantly improved. As a result, the motor 100 can be further improved in heat dissipation performance.

For example, the heat conductor 5 in FIG. 6A has a sheet shape, and is disposed by being sandwiched between the coil portion 22 and the extension 42. As the heat conductor 5, a graphite sheet or the like can be used, and preferably, a heat conduction sheet having electrical insulation properties can be used. This configuration enables the heat dissipation portion 4 disposed between the coil portion 22 and the extension 42 to be thinner as compared with a case of using the heat conductor 5 that is not in a sheet shape. Thus, the heat conduction path between the coil portion 22 and the extension 42 can be further shortened. Additionally, disposing the heat conductor 5 in a sheet shape enables an interval between the coil portion 22 and the extension 42 to be further narrowed. Thus, the extension 42 (particularly, the connector 422) can be disposed close to the coil portion 22. As a result, increase in size of the motor can be suppressed or prevented while heat dissipation performance is improved.

Alternatively, the heat conductor 5 may be a resin covering the coil head by being filled between the coil portion 22 and the extension 42 as illustrated in FIG. 6B. The material of the heat conductor 5 is preferably a composite resin containing a heat conductive filler. As the heat conductive filler, metal powder, ceramic powder, or the t like, which has good thermal conductivity, is used. Using the composite resin enables the heat conductor 5 to be easily disposed between the coil portion 22 and the extension 42.

One axial end portion (i.e., the coil head) of each of the coil portions 22 is preferably connected to at least one extension 42 with the heat conductor 5 interposed therebetween. This structure enables each of the coil portions 22 to transmit heat from the coil head to the extension 42 of the heat dissipation portion 4 with the heat conductor 5 interposed therebetween in a short path. Thus, more heat can be transmitted from the coil portion 22 to the heat dissipation portion 4, so that the motor 100 can be further improved in heat dissipation performance. However, the example described above does not exclude a configuration in which one axial end portion (i.e., the coil head) of at least one coil portion 22 is not connected to the extension 42 with the heat conductor 5 interposed therebetween.

Figure 7:
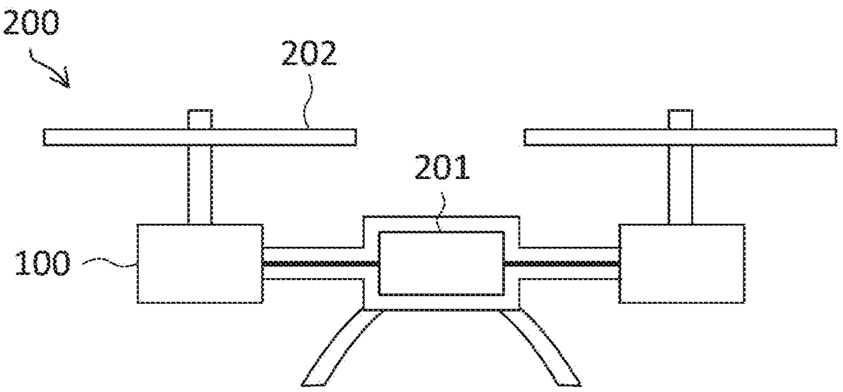
FIG. 7 is a diagram illustrating an example of a flight vehicle equipped with a motor according to an example embodiment of the present disclosure.

Next, an application example of the motor 100 will be described with reference to FIG. 7. FIG. 7 is a view illustrating an example of a flight vehicle 200 equipped with the motor 100. As illustrated in FIG. 7, the motor 100 is a drive source of the flight vehicle 200 such as a drone. The flight vehicle 200 includes the motor 100. The flight vehicle 200 further includes a battery 201 and a propeller 202. For example, the motor 100 receives power supply from the battery 201 to rotationally drive the propeller 202. However, this example does not exclude a configuration in which the motor 100 is mounted on a device other than the flight vehicle 200.

For example, the motor 100 of an outer rotor type according to the example embodiment described above may include the stator 2 with an outer diameter of 15 mm or more and 50 mm or less, and a height of 10 mm or more and 80 mm or less, and the rotor 1 with an outer diameter of 20 mm or more and 100 mm or less. For the stator 2 and the rotor 1 having these sizes, the motor 100 suitable for an application can be configured by appropriately selecting an outer diameter of a coil constituting the coil portion 22, a width and a length of the teeth, and the like.

The example embodiments of the present disclosure have been described above. The scope of the present disclosure is not limited to the example embodiments described above. The present disclosure can be implemented by making various modifications to the example embodiments described above without departing from the gist of the disclosure. Additionally, the matters described in the example embodiments described above can be appropriately combined within a range where no inconsistency occurs.

The example embodiments described above will be collectively described below.

For example, the motor disclosed herein has a configuration (first configuration) including: a rotor rotatable about a central axis extending in an axial direction; a stator including a stator core of a magnetic body in which a coil portion is located; a bracket including a stator holder in a tubular shape extending in the axial direction and surrounding the central axis, the stator holder holding the stator core; and a heat dissipation portion extending in one axial direction from the coil portion and being separate from the bracket, and held by the stator holder; wherein the heat dissipation portion includes: an annular portion that has an annular shape surrounding the stator holder and is located on a radially outer surface of the stator holder; and an extension extending radially outward from the annular portion.

The motor according to the first configuration may be configured such includes a plurality of extensions arranged side by side in the circumferential direction (second configuration).

The motor according to the second configuration may be configured such that the bracket further includes an attachment portion to attach the motor to an external predetermined portion; and the extension extending in another axial direction from the attachment portion, and between attachment portions including the attachment portion and being adjacent to each other in the circumferential direction viewed from the axial direction (third configuration).

The motor according to the third configuration may be configured such that the attachment portion includes a through-hole extending in the axial direction; and the extension is different in a circumferential position from the through-hole (fourth configuration).

The motor according to any one of the second to fourth configurations may be configured such that the extension is located between coil portions including the coil portion and being adjacent to each other in the circumferential direction as viewed in the axial direction; and at least a portion of one axial end portion of each of the coil portions is exposed to an outside of the motor (fifth configuration).

The motor according to any one of the first to fifth configurations may be configured such that a material of at least the annular portion of the heat dissipation portion is aluminum or an aluminum alloy (sixth configuration).

The motor according to any one of the first to sixth configurations may be configured such that the extension includes: a distal end portion expanding in a direction perpendicular to a radial direction at a radially outer end portion of the extension; and a connector that extends in the radial direction and connects the distal end portion to the annular portion (seventh configuration).

The motor according to any one of the first to seventh configurations may be configured such that the heat dissipation portion further includes a recess recessed in one axial direction at another axial end portion of the heat dissipation portion; and the recess is configured to accommodate one axial end portion of the coil portion (eighth configuration).

The motor according to any one of the first to eighth configurations may be configured such that the extension has a minimum axial width larger than a width of the extension in a direction perpendicular to the axial direction and the radial direction (ninth configuration).

The motor according to any one of the first to ninth configurations may further include a heat conductor located between the coil portion and the extension in the axial direction and in contact with the coil portion and the extension (tenth configuration).

The motor according to the tenth configuration may be configured such that the heat conductor has a sheet shape (eleventh configuration).

The motor according to the tenth or eleventh configuration may be configured such that the heat conductor is made of a composite resin including a heat conductive filler (twelfth configuration).

The motor according to any one of the tenth to twelfth configurations may be configured such that the extensions are equal to or larger in number than the coil portions; and each of the coil portions includes one axial end portion connected to at least one of the extensions with the heat conductor interposed between the coil portion and the at least one extension (thirteenth configuration).

The motor according to any one of the first to thirteenth configurations may be configured such that the rotor includes a magnet opposing the stator in the radial direction; and the stator is located radially inward of the magnet (fourteenth configuration).

Example embodiments of the present disclosure are useful for a motor device including a structure that dissipates heat generated in a stator.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor comprising:

a rotor rotatable about a central axis extending in an axial direction;

a stator including a stator core of a magnetic body in which a coil portion is located;

a bracket including a stator holder in a tubular shape extending in the axial direction and surrounding the central axis, the stator holder holding the stator core; and a heat dissipation portion extending in one axial direction from the coil portion, being separate from the bracket, and held by the stator holder; wherein the heat dissipation portion includes:

an annular portion that has an annular shape surrounding the stator holder and is located on a radially outer surface of the stator holder; and an extension extending radially outward from the annular portion;

the extension includes a plurality of extensions arranged side by side in a circumferential direction;

the bracket further includes an attachment portion to attach the motor to an external predetermined portion; and the extension extends in another axial direction from the attachment portion, and between attachment portions including the attachment portion and being adjacent to each other in the circumferential direction as viewed from the axial direction.

2. The motor according to claim 1, wherein the attachment portion includes a through-hole extending in the axial direction; and the extension is different in a circumferential position from the through-hole.

3. The motor according to claim 1, wherein the extension is located between coil portions including the coil portion and adjacent to each other in the circumferential direction as viewed in the axial direction; and at least a portion of one axial end portion of each of the coil portions is exposed to an outside of the motor.

4. The motor according to claim 1, wherein a material of at least the annular portion of the heat dissipation portion is aluminum or an aluminum alloy.

5. The motor according to claim 1, wherein the extension has a minimum axial width larger than a width of the extension in a direction perpendicular to the axial direction and a radial direction.

6. The motor according to claim 1, wherein the rotor includes a magnet opposing the stator in the radial direction; and the stator is located radially inward of the magnet.

7. The motor according to claim 1, wherein the extension includes:

a distal end portion expanding in a direction perpendicular to a radial direction at a radially outer end portion of the extension; and a connector that extends in the radial direction and connects the distal end portion to the annular portion.

8. The motor according to claim 7, wherein the heat dissipation portion further includes a recess recessed in one axial direction at another axial end portion of the heat dissipation portion; and the recess is configured to accommodate one axial end portion of the coil portion.

9. The motor according to claim 1, further comprising a heat conductor located between the coil portion and the extension in the axial direction and in contact with the coil portion and the extension.

10. The motor according to claim 9, wherein the heat conductor has a sheet shape.

11. The motor according to claim 9, wherein the heat conductor is made of a composite including a heat conductive filler.

12. The motor according to claim 9, wherein the extensions are equal to or larger in number than the coil portions; and each of the coil portions includes one axial end portion connected to at least one of the extensions with the heat conductor interposed between the coil portion and the at least one extension.

* * * * *